US008688464B2

(12) United States Patent
Sunday et al.

(10) Patent No.: US 8,688,464 B2
(45) Date of Patent: *Apr. 1, 2014

(54) SCREENING ELECTRONIC SERVICE REQUESTS

(71) Applicant: Oracle International Corporation, Redwood Shores, CA (US)

(72) Inventors: Mark Sunday, Redwood City, CA (US); Ken Wells, Foster City, CA (US); Mitchell Kreaden, San Mateo, CA (US); Anthony Deighton, San Francisco, CA (US); Dougal Brindley, Alameda, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,071

(22) Filed: Nov. 26, 2012

(65) Prior Publication Data

US 2013/0085794 A1 Apr. 4, 2013

Related U.S. Application Data

(60) Division of application No. 12/434,951, filed on May 4, 2009, now Pat. No. 8,321,232, and a continuation of application No. 10/112,467, filed on Mar. 29, 2002, now Pat. No. 7,529,680.

(51) Int. Cl.
*G06Q 10/00* (2012.01)
*H04M 3/42* (2006.01)
*H04M 1/24* (2006.01)

(52) U.S. Cl.
USPC .................. 705/1.1; 379/9.03; 379/211.01

(58) Field of Classification Search
USPC .................. 705/1.1, 304; 379/9.03, 211.01
See application file for complete search history.

(56) References Cited

U.S. PATENT DOCUMENTS 7,117,239 B1 * 10/2006 Hansen .................. 709/200
7,225,139 B1 * 5/2007 Tidwell et al. ............ 705/7.15

* cited by examiner

*Primary Examiner* — Gabrielle McCormick
*Assistant Examiner* — Sangeeta Bahl
(74) *Attorney, Agent, or Firm* — Campbell Stephenson LLP (57) ABSTRACT

A facility for screening service requests for requesting assistance is described. The facility receives from a user a service request that requests assistance with solving a problem associated with a system accessible to the user and includes information related to the system. The facility searches a collection of system status information for at least one entry that corresponds with the received information related to the system. Where a corresponding entry is found, the facility provides to the user an indication of the correspondence and an opportunity to cancel the service request.

21 Claims, 8 Drawing Sheets

Microsoft Internet Explorer

File Edit View Favorites Tools Help

← Back ▼ → ▼ ⊗ ☆ | ⊙ Search ☐ Favorites ⊙ History | 🖂 ▼ 🖨 🗒

Address [ ]                                                          ⮕ Go  Links »

Show: [My Service Request ▼]

Click on "New" to create a new service request. Click on "Query" to search for service requests that you have created.

My Service Requests — 502                                          518
( New ) ( Query ) | ◁ ▷ | 1 - 10 of 10+                               ⌐ 516 ⌐ 522
                                                            System Status

| SR# ⇔ | Status ⇔ | Created ⇔ | Summary ⇔ 514 | | Name | Status | Status (Icon) |
|---|---|---|---|---|---|---|---|
| 1-3602601 | Open | 2/19/2002 10:41:25 AM | Air conditioning question | | E-mail | Currently Available | ☐ |
| 1-3601104 | Open 510 | 2/6/2002 12:16:15 PM | Having a problem with the air conditioning | | File Sharing | Currently Available | ☐ |
| 1-3601001 | Open | 2/5/2002 5:29:43 PM | Request for a monitor | | Internet Access | Currently Available | ☐ |
| 1-3600403 | Open | 2/5/2002 10:29:45 AM | I have a request for a 401K information | | Network | Currently Available | ☐ |
| 1-3599601 | Open | 1/30/2002 1:27:08 PM | Request for a new screen | | Printers | Diminished Service | ☐ |
| 1-2676001 | Open | 9/11/2001 3:17:56 PM | Request for a 19" monitor | | Remote Access | Currently Available | ☐ |
| 1-2028701 | Pending | 8/30/2001 9:58:18 AM | Product Documentation needs to be updated | | Voice | Currently Available | ☐ |
| 1-1877710 | Pending | 8/18/2001 10:45:14 AM | Benefits question | | eBiz | Currently Available | ☐ |
| 1-1877703 | Closed | 8/18/2001 10:44:30 AM | Vacation Accrual balance incorrect | | eProcurement | Currently Available | ☐ |
| 1-1877706 | Closed | 8/18/2001 10:43:50 AM | Telephone Speaker not working | | mySiebel | Currently Available | ☐ |

504          524
508

☐ Done                                                    ☐☐☐ Local Intranet

SCREENING ELECTRONIC SERVICE REQUESTS

CROSS-REFERENCE TO RELATED APPLICATIONS

This application is a divisional of U.S. application Ser. No. 12/434,951, entitled "Screening Electronic Service Requests," filed on May 4, 2009 and naming Mark Sunday, Ken Wells, Mitchell Kreaden, Anthony Deighton and Dougal Brindley as inventors, issuing on Nov. 27, 2012 as U.S. Pat. No. 8,321,232, which is a continuation of U.S. application Ser. No. 10/112,467, entitled "Screening Electronic Service Requests," filed on Mar. 29, 2002 and naming Mark Sunday, Ken Wells, Mitchell Kreaden, Anthony Deighton and Dougal Brindley as inventors, issued on May 5, 2009 as U.S. Pat. No. 7,529,680. All of the above-identified applications and their disclosures are incorporated herein by reference for all purposes as if completely and fully set forth herein.

TECHNICAL FIELD

The following disclosure relates generally to submitting requests electronically, and more particularly to submitting requests in a manner that provides for efficient handling of electronically submitted requests.

BACKGROUND

Organizations are increasingly implementing and relying on internal systems that function over a wide-base infrastructure, such as intranets. When problems occur that are related to the use of such systems, members of the organization and other users that have access to the systems, such as employees and customers, may typically call or send a message to a helpdesk or support center run by a support staff in order to seek assistance. Once a user reports a problem or requests assistance to solve a problem, a member of the support staff may generate a trouble ticket to log the report or request. The support staff then investigates the problem that is affecting the user, which is often related to an infrastructure outage or some sort of planned or unplanned diminished service. For example, an employee attempting to use a printer connected to a network may experience difficulty when attempting to print a document. The employee may not completely understand the problem, but has enough knowledge that he or she may provide a general description of the problem (e.g., "the printer on the third floor is not printing") to an IT support staff member, who then generates a report. Eventually, one or more support staff members are assigned to investigate and ultimately resolve the printer problem.

While there are several different categories of helpdesk requests (e.g., how to, request for change, break/fix, etc.), industry reports reflect that infrastructure outages typically make up a significant percentage of total helpdesk requests (approximately eighteen percent of all helpdesk requests). Often, where a problem is related to an infrastructure outage or diminished service of a system or subsystem, the support staff may already have knowledge of the problem, yet have no way to convey such knowledge to others within the organization. For example if the problem with the networked printer described in the above-cited example was related to a planned maintenance outage, several employees may be experiencing problems with one or more printers on the network. Although the support staff already knows of the problem, its members may be left to respond to multiple requests for assistance. Receiving large numbers of these types of service requests often prevents the support staff from addressing other issues and results in inefficient use of the organization's resources. Recent industry reports estimate that each service request contact costs an organization an average of sixteen dollars.

While various mechanisms, such as electronic mail alert messages and postings on intranet home pages, are available to alert users that a problem has been acknowledged by the support staff, such alerts may often go unnoticed and the support staff will nonetheless receive multiple service requests or problem reports.

It would be desirable to have a tool that notifies a user of a system about known problems and outages in that system at the time that the user proceeds to report a problem that the user is experiencing or request some sort of assistance.

BRIEF DESCRIPTION OF THE DRAWINGS

FIG. 5 is a display diagram showing a web page displaying a list of a user's previously submitted service requests in one embodiment.

DETAILED DESCRIPTION

I. Introduction

A system and method for screening electronic service requests is provided. A user submitting a request is notified if the request is potentially related to information that is already known by those responsible for addressing the request (e.g., an IT support staff). Notification of the user occurs before the request is ultimately submitted to the appropriate individual or individuals. Notification of the user at this time enables the user to cancel the service request if its submission would be redundant. For example, a user may wish to submit a service request that her voicemail is not working properly. In order to submit the service request, she completes an on-line service request form with information about her problem. She then indicates that she wishes to submit the service request by selecting a "submit" button on her screen. Unbeknownst to the user, voicemail access at her location is temporarily unavailable because of a routine maintenance outage. Accordingly, the user is immediately notified of the planned outage by a message on her screen. She is then given an option to either cancel the submission of the service request or proceed with submitting the service request.

By providing a standardized facility for submitting service request information, one or more information fields of a service request may be checked against a collection of entries that indicate the status of one or more systems or subsystems typically available to or accessible by the user (herein "system status entries" or "system status information"). For example, the status of voicemail, printers, phone systems, email, shared databases, printers, and other interconnected utilities may be consistently monitored and changes in the status of these systems and subsystems may be recorded as they arise or become known. In another example, changes in system status become known as a result of users submitting service requests identifying a problem. Once known, the information pertaining to these systems and subsystems is stored forming a collection of system status entries, which are then searched when a new service request is submitted. If, as a result of a search or comparison, at least one relation between a service request field and a system status entry field is identified, the user is informed of the relation and asked if he or she desires to proceed with the service request. In other cases, where no relation is identified, the service request may be submitted without additional user action.

The facility for submitting request information may consist of, for example, a web page that includes facilities to receive input data, such as a form with fields to be filled in, pull-down menus or entries allowing one or more of several options to be selected, buttons, sliders, or other known user interface tools for receiving user input in a web page. The facility for submitting system and subsystem status entries and status updates may be similar to the facility for submitting request information, and may include one or more input fields that mirror those for submitting request information. Such mirroring provides for the identification of possible relations between requests and system status information. In other embodiments, an independent facility for submitting system status entries is not utilized, as the system status entries are generated from or consist of other pending service requests.

II. System Overview and Overall Architecture

Figure 1:
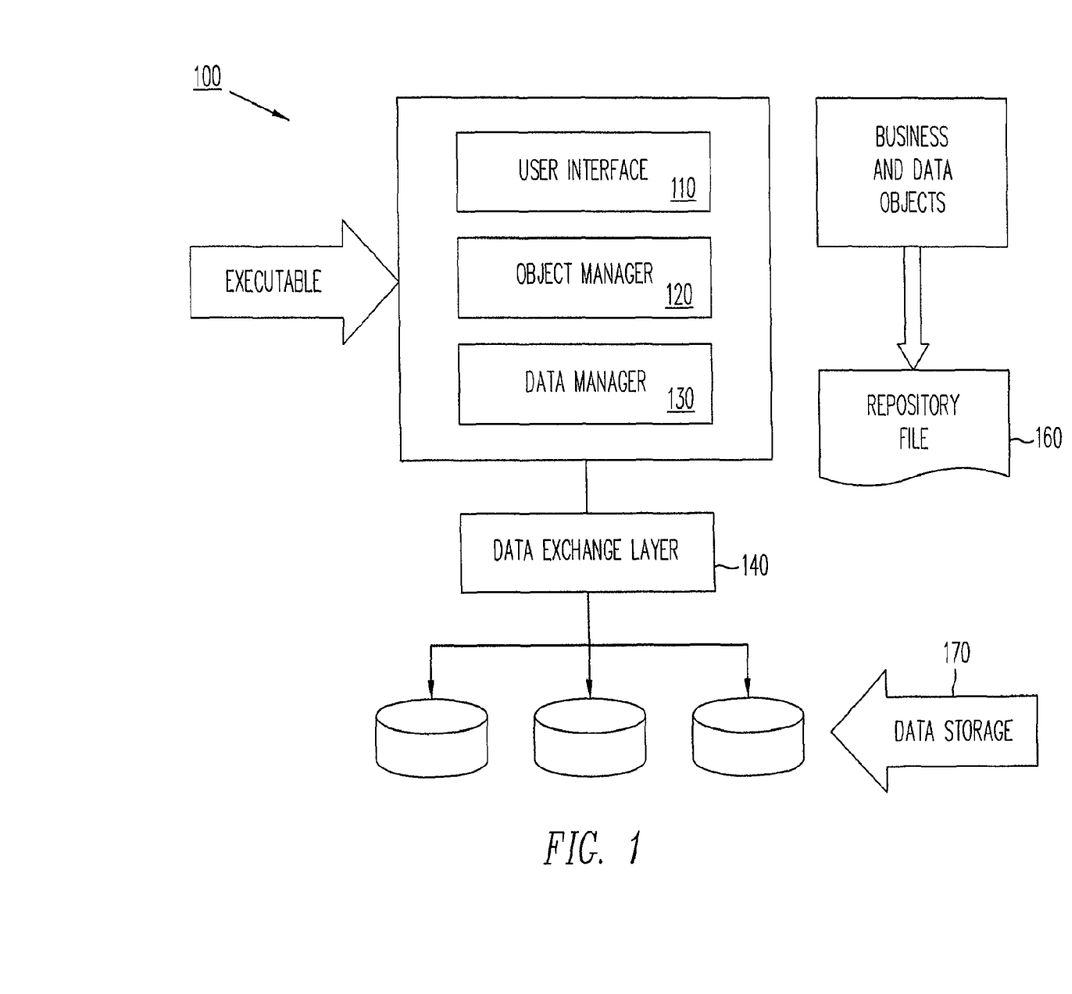
FIG. 1 shows a multi-layered system architecture in which the teachings of the present invention are implemented.

In one embodiment, a system in which the teachings of the present invention are implemented can be logically structured as a multi-layered architecture as shown in FIG. 1. In one embodiment, the logical multi-layered architecture as shown in FIG. 1 provides a platform for common services to support the various applications. These services may include a user interface layer 110, an object manager layer 120, a data manager layer 130, and a data exchange layer 140.

In one embodiment, the user Interface layer 110 may provide the applets, views, charts and reports, etc. associated with one or more applications. In one embodiment, various types of clients can be supported via the user interface layer 110. These various types of clients may include traditional connected clients, remote clients, thin clients over an intranet, Java thin clients or non-Windows-based operating systems, and HTML clients over the Internet, etc.

In one embodiment, the object manager layer 120 is designed to manage one or more sets of business rules or business concepts associated with one or more applications and to provide the interface between the user interface layer 110 and the data manager layer 130. In one embodiment, the business rules or concepts can be represented as business objects. In one embodiment, the business objects may be designed as configurable software representations of the various business rules or concepts such as accounts, contacts, opportunities, service requests, solutions, etc.

In one embodiment, the data manager layer 130 is designed to maintain logical views of the underlying data and to allow the object manager to function independently of underlying data structures or tables in which data are stored. In one embodiment, the data manager 130 may also provide certain database query functions such as generation of structure query language (SQL) in real time to access the data. In one embodiment, the data manager 130 is designed to operate on object definitions in a repository file 160 that define the database schema. In one embodiment, the data storage services 170 provide the data storage for the data model associated with one or more applications.

In one embodiment, the data exchange layer is designed to handle the interactions with one or more specific target databases and provide the interface between the data manager layer 130 and the underlying data sources.

Figure 2:
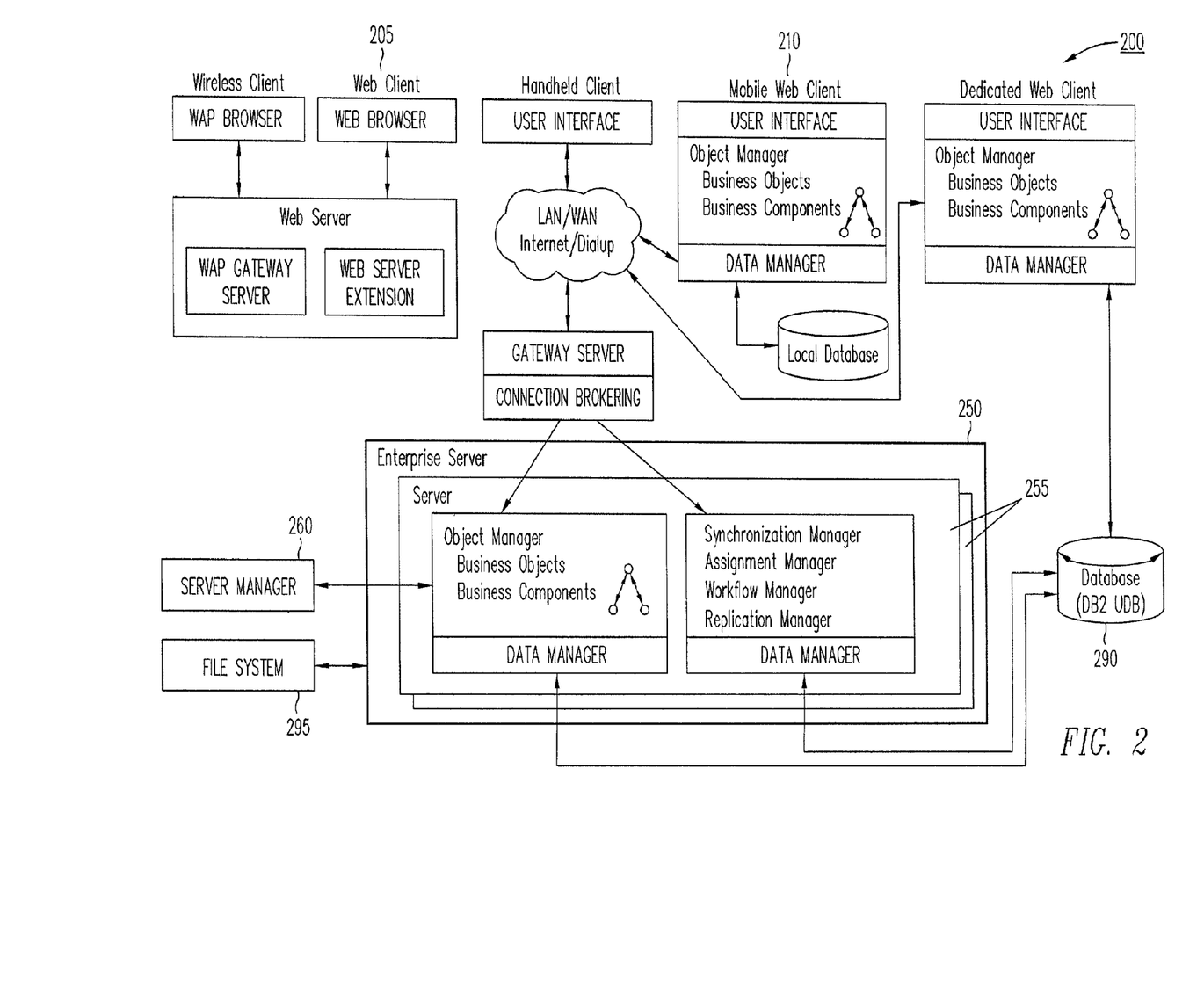
FIG. 2 shows a block diagram of one embodiment of a system configuration in which the teachings of the present invention are implemented.

FIG. 2 shows a block diagram of one embodiment of a system configuration in which the teachings of the present invention are implemented.

In one embodiment, the multi-layered architecture allows one or more software layers to reside on different machines. For example, in one embodiment, the user interface, the object manager, and the data manager can all reside on the dedicated web clients. For other types of clients such as the wireless clients, in one embodiment, the object manager and data manager can reside on a system server. It should be appreciated and understood by one skilled in the art that the system configuration shown in FIG. 2 is for illustrative and explanative purposes and may vary depending upon the particular implementations and applications of the teachings of the present invention.

In one embodiment, the system environment illustrated in FIG. 2 may include more than one database 290. One or more subsets of the database 290 can be created or replicated by a replication manager. In addition, mobile web clients can have additional remote databases (also called local databases). In one embodiment, unless the remote or local databases associated with the mobile web clients are defined as read-only databases, these mobile web clients can create and update data locally that will be ultimately propagated up to the primary database when each mobile web client synchronizes with the system server.

In one embodiment, the database 290 is designed to store various types of data including predefined data schema (e.g., table objects, index objects, etc.), repository objects (e.g., business objects and components, view definitions and visibility rules, etc.), and user's or customer's data. In one embodiment, dedicated web clients and server components, including those that operate in conjunction with the other types of clients, can connect directly to the database 290 and make changes in real time. In one embodiment, mobile web clients can download a subset of the server's data to use locally, and periodically synchronize with the server database through the system server to update both the local and the server database.

In one embodiment, various tables included in the database 290 may be logically organized into the following types: data tables, interface tables, and repository tables, etc.

In one embodiment, data tables may be used to store user business data, administrative data, seed data, and transaction data, etc. In one embodiment, these data tables may be populated and updated through the various applications and processes. In one embodiment, data tables may include the base tables and the intersection tables, etc. In one embodiment, base tables may contain columns that are defined and used by the various applications. In one embodiment, the base tables are designed to provide the columns for a business component specified in the table property of that business component. In one embodiment, intersection tables are tables that are used to implement a many-to-many relationship between two business components. They may also hold intersection data columns, which store information pertaining to each association. In one embodiment, intersection tables provide the data structures for association applets.

In one embodiment, interface tables are used to denormalize a group of base tables into a single table that external programs can interface to. In one embodiment, they may be used as a staging area for exporting and importing of data.

In one embodiment, repository tables contain the object definitions that specify one or more applications regarding:
The client application configuration
The mapping used for importing and exporting data
Rules for transferring data to mobile clients In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, dedicated web clients can read and write files directly to and from the file system 295. In one embodiment, mobile web clients can have a local file system, which they synchronize with the server-based file system 290 periodically. In one embodiment, other types of client such as the wireless clients and the web clients can access the file system 290 via the system server.

In one embodiment, the enterprise server 250 is a logical grouping of the system servers 255 that share a common table owner or a database, point to a common gateway Server, and can be administered as a group using a server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile web clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, service, and interactive modes.

In one embodiment, the server manager 260 is configured as a utility that allows common control, administration and monitoring across disparate programs for the servers 255 and the enterprise server 250. In one embodiment, the server manager 260 can be used to perform the following tasks: start, stop, pause, and resume servers 255, components, and tasks; monitor status and collect statistics for multiple tasks, components, and servers within an enterprise server; and configure the enterprise server, individual servers, individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing function such as directing client connection requests to an appropriate server (e.g., the least-busy server).

In one embodiment, as illustrated in FIG. 2, the various types of clients that can be supported by the system may include the following clients: dedicated web clients, mobile web clients, web clients, wireless clients, and handheld clients, etc.

In one embodiment; dedicated web clients (also called connected clients) are connected directly to a database server for data access via a LAN or WAN connection. In one embodiment, these connected or dedicated web clients do not store data locally. These dedicated web clients can also access the file system directly. In one embodiment, the user interface, the object manager, and the data manager layers of the multi-layered architecture reside on the dedicated web client.

In one embodiment, the mobile web clients are designed and configured for local data access and thus can have their own local database and/or local file system. In one embodiment, mobile web clients can interact with other components within the system via the gateway server. Through synchronization, the modifications from the local database and the server database can be exchanged. Mobile web clients are described in more detail below.

In one embodiment, a web client runs in a standard browser format from the client's machine. In one embodiment, the web client can connect to a system server 255 through a web server. In one embodiment, the system server 255 is designed and configured to execute business logic and access data from the database 290 and file system 295. In one embodiment, the web client described herein is designed and configured in accordance with the teachings of the present invention to operate in an interactive mode. In one embodiment, the interactive web client framework as described herein utilizes dynamically created objects implemented in JavaScript on the browser side that correspond to objects on the server side. In one embodiment, these dynamically created objects on the browser side may include the current view and its corresponding applets, the current business object and the corresponding business components, etc. The web client is described in more detail below.

In one embodiment, wireless clients are essentially thin clients enabled on wireless devices. The wireless clients can use a wireless application protocol (WAP)-based user interface to communicate and exchange information/data with the system server.

The system configuration illustrated in FIG. 2 is described in more details below with references to various structures, databases, tables, file systems, etc. as illustrating examples.

Figure 3:
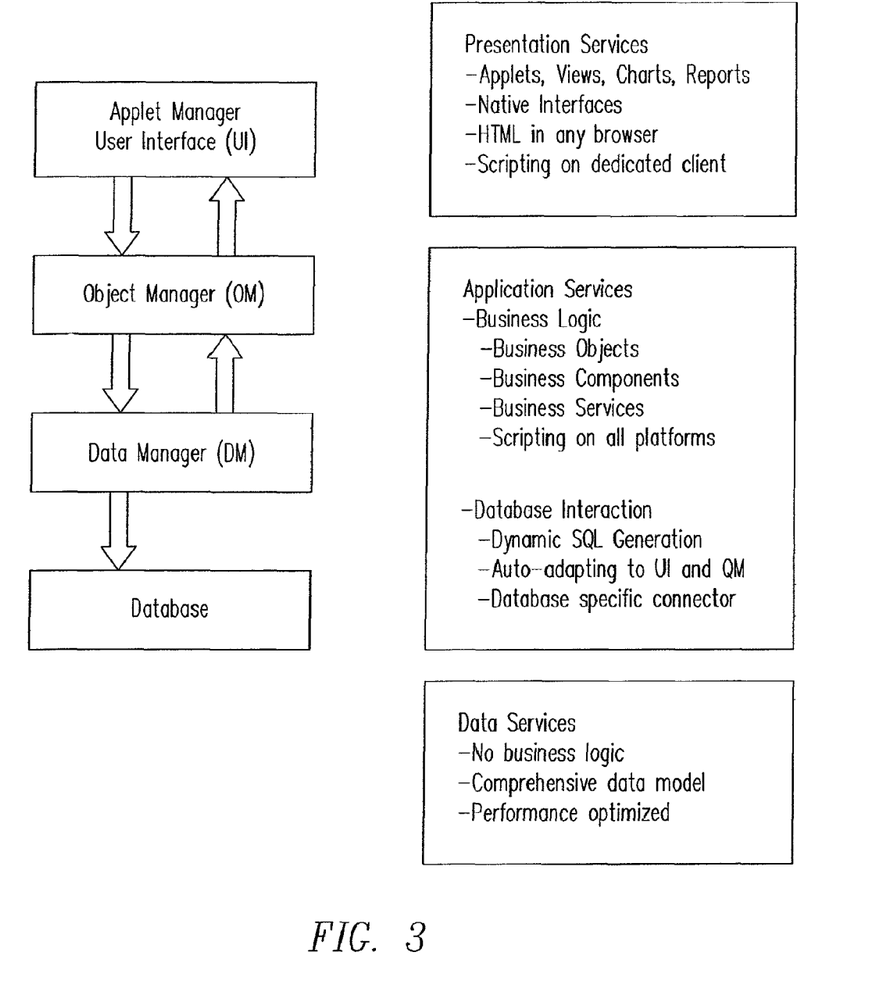
FIG. 3 shows a block diagram illustrating another logical representation of a multi-layered architecture in which applications can be built in accordance with the teachings of the present invention.

FIG. 3 shows a block diagram illustrating another logical representation of a multi-layered architecture in which applications can be built in accordance with the teachings of the present invention. Again, the multi-layered architecture as illustrated in FIG. 3 provides the configured platform for various common services designed to support the various applications. In one embodiment, these various services may include presentation services logic layer 315, which corresponds to an applet manager and user interface layer 310, application services logical layer 325, which corresponds to an object manager (OM) layer 320 and a data manager (DM) layer 330, and data services logical layer 345, which corresponds to a database layer 340.

In one embodiment, the presentation services 315 may be designed and configured to support various types of clients and may provide them with user interface applets, views, charts, and reports, etc. As described above, a large variety of clients may be supported including wireless clients, handheld clients, web clients, mobile web clients, and dedicated (connected) clients, etc.

In one embodiment, the application services 325 may include business logic services and database interaction services. In one embodiment, business logic services provide the class and behaviors of business objects and business components. In one embodiment, database interaction services may be designed and configured to take the user interface (UI) request for data from a business component and generate the database commands (e.g., SQL queries, etc.) necessary to satisfy the request. For example, the data interaction services may be used to translate a call for data into DBMS-specific SQL statements.

In one embodiment, data storage services 345 may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
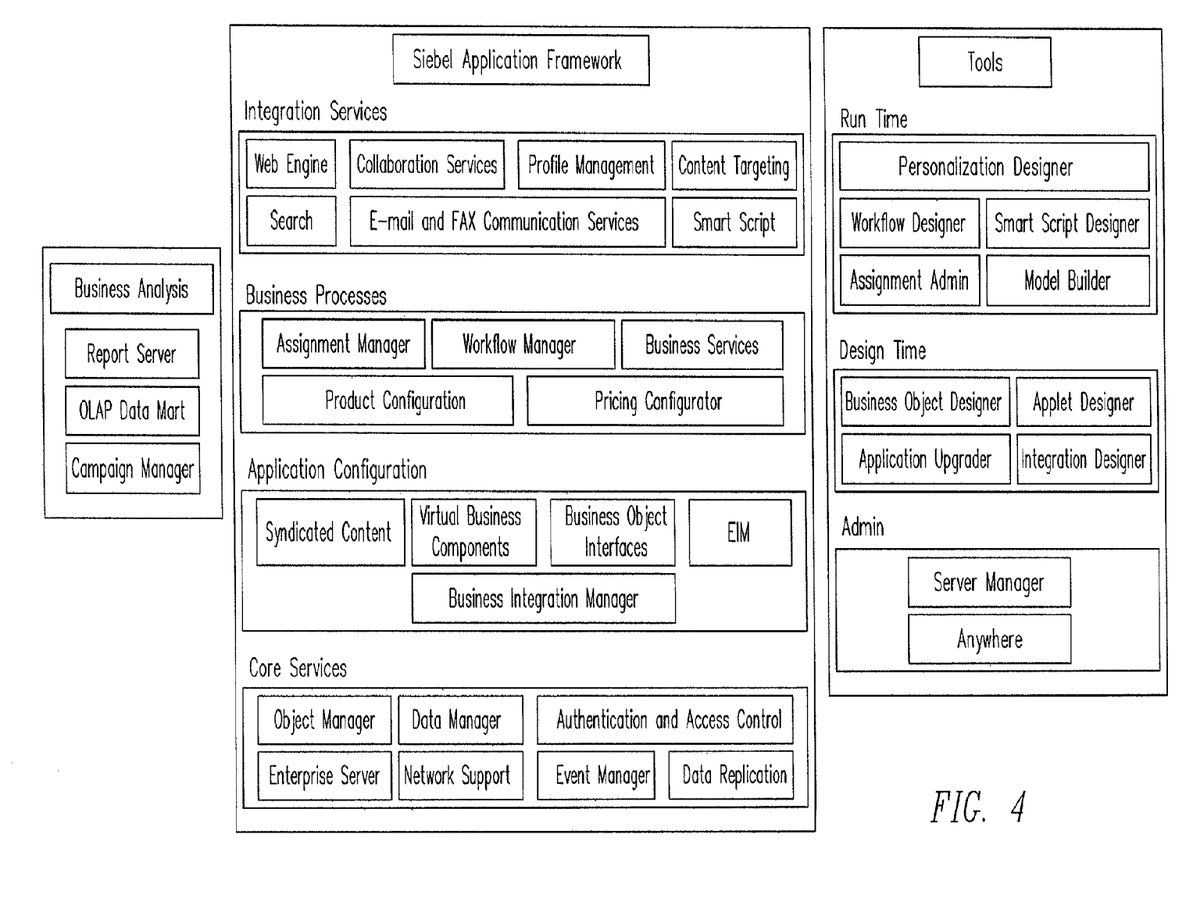
FIG. 4 illustrates a block diagram of one embodiment of an application framework in which the teachings of the present invention may be implemented.

FIG. 4 illustrates a block diagram of one embodiment of an application framework in which the teachings of the present invention may be implemented. As illustrated in FIG. 4, the application framework may include various logical groupings of various types of services and various types of tools that can be used to design and configure particular applications based on business needs and environments.

In one embodiment, the core services are designed and configured to provide the framework in which the applications execute. In one embodiment, the core services may include the following:
  The enterprise server, which is the middle-tier application server
  The networks that link all of these pieces together
  Facilities like event manager and data replication, which allow sharing data between multiple installations of various applications as well as between the various applications and other external applications
  The authentication and access control, the security facilities.

In one embodiment, application integration services may be designed and configured to allow the various applications built in accordance with this framework to communicate with the external world. In one embodiment, the various types of services in this logical grouping may be designed and configured to provide for real-time, near-real-time, and batch integration with external applications. For example, these integration services may be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information, and a server having information requested from it.

In one embodiment, business processes services are designed and configured to allow the client to automate business processes through the application. In one embodiment, these various business process services may include the following:
  Assignment of tasks through Assignment Manager
  Enforcement of business practices through Workflow Manager
  Reuse of custom business logic through Business Services
  Ensuring proper product configuration and pricing through the Product Configurator and Pricing Configurator In one embodiment, creation of these business processes can be done through Run-Time tools such as Personalization Designer, Workflow Designer, SmartScript Designer, Assignment Administration Views, and the Model Builder, etc.

In one embodiment, integration services may be designed and configured to provide the client with user interface and thin client support. In one embodiment, these may include capabilities for building and maintaining web-based applications, providing web support facilities such as user Profile Management, Collaboration Services and Email and Fax services, as well as advanced Smart Scripting, etc.

In one embodiment, design time tools may be designed and configured to provide the services to customize, design, provide integration points, and maintain the application. These various tools provide one common place to define the application.

In one embodiment, admin services are designed and configured provide one place to monitor and administer the application environment. In one embodiment, these services allow the user to administer the application either through a graphic user interface (GUI) or from a command line, etc.

III. User Interface and Submission/Screening of Electronic Service Requests

FIGS. 5-8 illustrate a user interface provided by one embodiment of the electronic service requests screening system. The terms "screen," "web page," and "page" are generally used interchangeably herein. The web pages described herein may be implemented using, for example, XML (extensible markup language) or HTML (hypertext markup language) scripts that provide information to a user. In general, a "link" refers to any resource locator identifying a resource on a network, such as a display description provided by an organization having a site or node on the network. The web pages are stored as display descriptions, graphical user interfaces, or other methods of depicting information on a computer screen where the layout and information or content to be displayed on the page is stored in a database or other storage facility. While aspects of the invention are described using a network environment, some or all features may be implemented within a single-computer environment.

FIG. 5 is a display diagram showing a "MY SERVICE REQUESTS" page 500 displaying a list of a user's previously submitted service requests in one embodiment. From this page, the user may view previously submitted service requests in a "MY SERVICE REQUESTS" display area 502. The user may also select a "NEW" button 504 to create a new service request. Selection of the "NEW" button causes the display of a page from which the user may create a new service request, such as the "MY SERVICE REQUESTS—HELPDESK ONLINE" page 600 of FIG. 6. From the "MY SERVICE REQUESTS" page 500, the user may also select a "QUERY" button 506 to search for service requests that the user previously submitted.

In this embodiment, the information displayed in the "MY SERVICE REQUESTS" text area 502 includes an identification number 508 that has been assigned to the submitted service request, a status 510 for the submitted request (e.g., open, closed, pending. etc.), a date and time 512 that the service request was created, and a brief description that summarizes the service request 514. Additionally, a "SYSTEM STATUS" display area 516 displays information relating to the status of various systems available to the user. In this example, the name 518 and status 520 (e.g., available, diminished, etc.) of each system is provided, along with a status icon 522 that provides a quickly viewed indication of the status of the system. In this embodiment, each listed status name label 524 functions as a Uniform Resource Locator link to a page that displays details about each system, including information related to various subsystems associated with each system.

Figure 6:
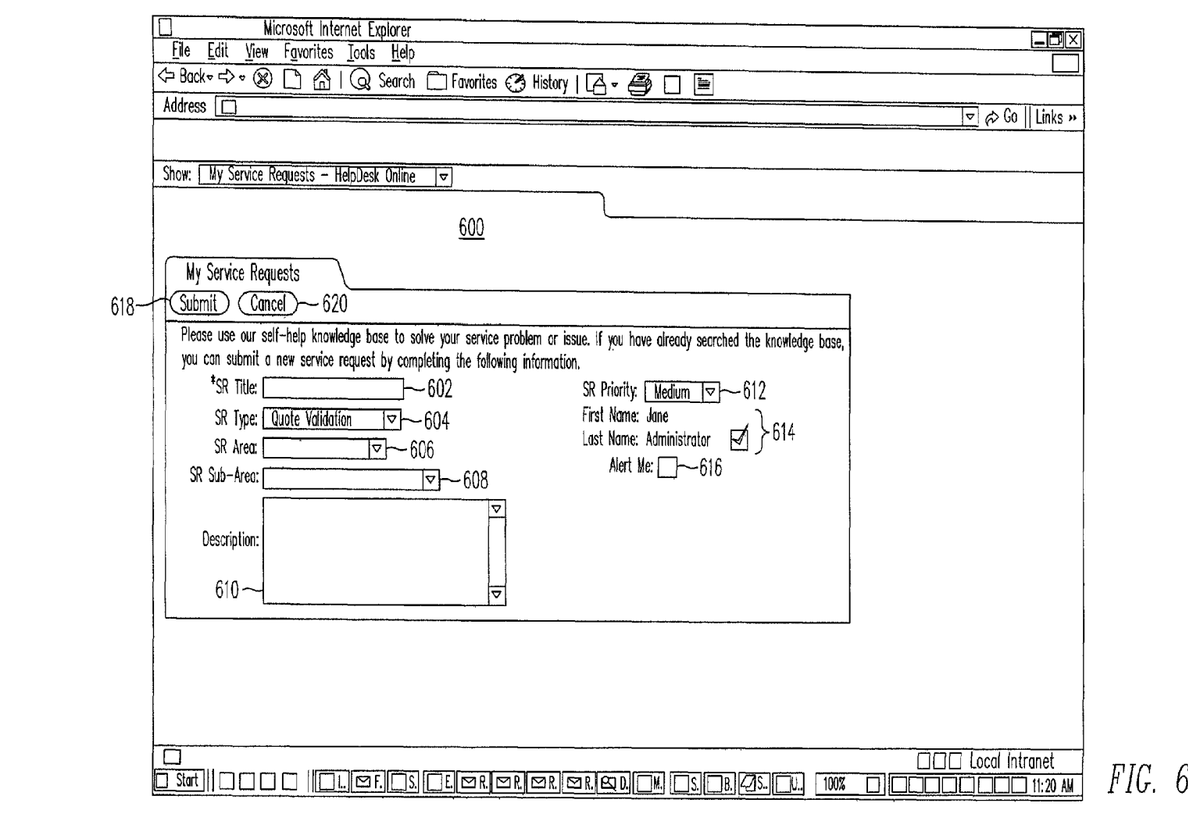
FIG. 6 is a display diagram showing a web page through which a user may input information in order to create a service request in one embodiment.

FIG. 6 is a display diagram showing a "MY SERVICE REQUESTS—HELPDESK ONLINE" page 600 through which a user may enter information in order to create a service request. An "SR TITLE" field 602 holds a title for the service request that may be used to quickly identify the nature of the service request. The "SR TYPE" 604 drop-down menu provides a list of service request categories from which the user may select the category that best corresponds to the service request type. In this example the user has requested a problem relating to "QUOTE VALIDATION." Other examples of service requests types include "Competency," "Support," "Facilities," "Finance," "Human Relations," "IT/eBiz," "Payroll," "Training," and "My Company." One skilled in the art would recognize, however, that various other request types are possible. In this embodiment, the information in the field "SR TYPE" 604 is used to describe the nature of the request and not used for matching requests with system status entries.

From the "MY SERVICE REQUESTS—HELPDESK ONLINE" page 600, the user may also select an item from a "SR AREA" drop-down menu 606. In this embodiment, the particular SR area selected by the user may correspond to a particular system that may be the basis of the user's service request. Example of SR areas include "Facilities," "Finance," "Human Resources," "IT," "MfgOps," and "Payroll." Unlike the SR types, the SR areas in this embodiment are used to match requests with system status information. Similarly, information retrieved from a "SR SUB-AREA" drop-down menu 608 may be used to match service requests with subsystem status information. For purposes of illustration, examples of sub-areas within an "IT" area may include "Hardware Break/Fix," "Desktop Hardware," "Dial-up," "File Sharing," "Laptop Hardware," "Local Connectivity," "Net Conference," "Net meeting," "Password," "Printing," "Telephone/Voicemail," and "Windows 2000." Examples of sub-areas within a "Facilities" area may include "Air Conditioning," "Doors," "Electrical," "Elevators," "Furniture," "General Exterior," "Plumbing," "Security," "Appliances," "Lighting," "Facilities/conference," "Moves," "Locks," "Recycling," and "Refreshments."

The following example further illustrates the use of the "SR AREA" 606 and "SR SUB-AREA" 608 fields as provided in this embodiment. An employee having problems with the temperature of his office being too cold may create a service request choosing "Facilities" for both the "SR TYPE" 604 and the "SR AREA" 606 fields and "Air Conditioning" for the "SR-SUB AREA" 608 field. Although not apparent from this example, it is unnecessary that each SR area or sub-area entry provided in the drop-down menus correspond with a monitored system or subsystem. For example, while a service request for fixing problems with email or a service request for repairing a broken elevator may be connected to some sort of system or subsystem, a service request for help with moving office furniture may not be linked with a system in this way. In such a case, the information provided in the "SR AREA" 606 and "SR SUB-AREA" 608 fields may be useful for purposes such as determining the recipient of the request or describing a problem so that appropriate measures may be taken to address the problem. The information provided by the user in a "DESCRIPTION" text area 610, in this embodiment, may also serve a similar function. In another embodiment, however, information of this type, like the SR area and SR sub-area information, may also be used to identify relationships between service requests and system and sub-system status information, using, for example key term searches.

Once the user has entered information about the type of the request, the user may select a priority for the request (e.g., "Very High," "High," "Medium," "Low," etc.). In this embodiment, the first and last name of the user 614 is automatically displayed on the request. In alternate embodiments, the user may be prompted to input his or her name, location, or other identifying information, such as an email address or phone number. Once the user has inputted the appropriate service request information, the user may submit the service request by selecting a "SUBMIT" button 618, or cancel the service request by selecting a "CANCEL" button 620. In this embodiment, if the user has selected an "ALERT ME" checkbox 616, the service request will not be sent to the helpdesk server until a search is conducted to identify any available system or subsystem status information that may be relevant to the service request, and the user is alerted of any such identified information.

Figure 7:
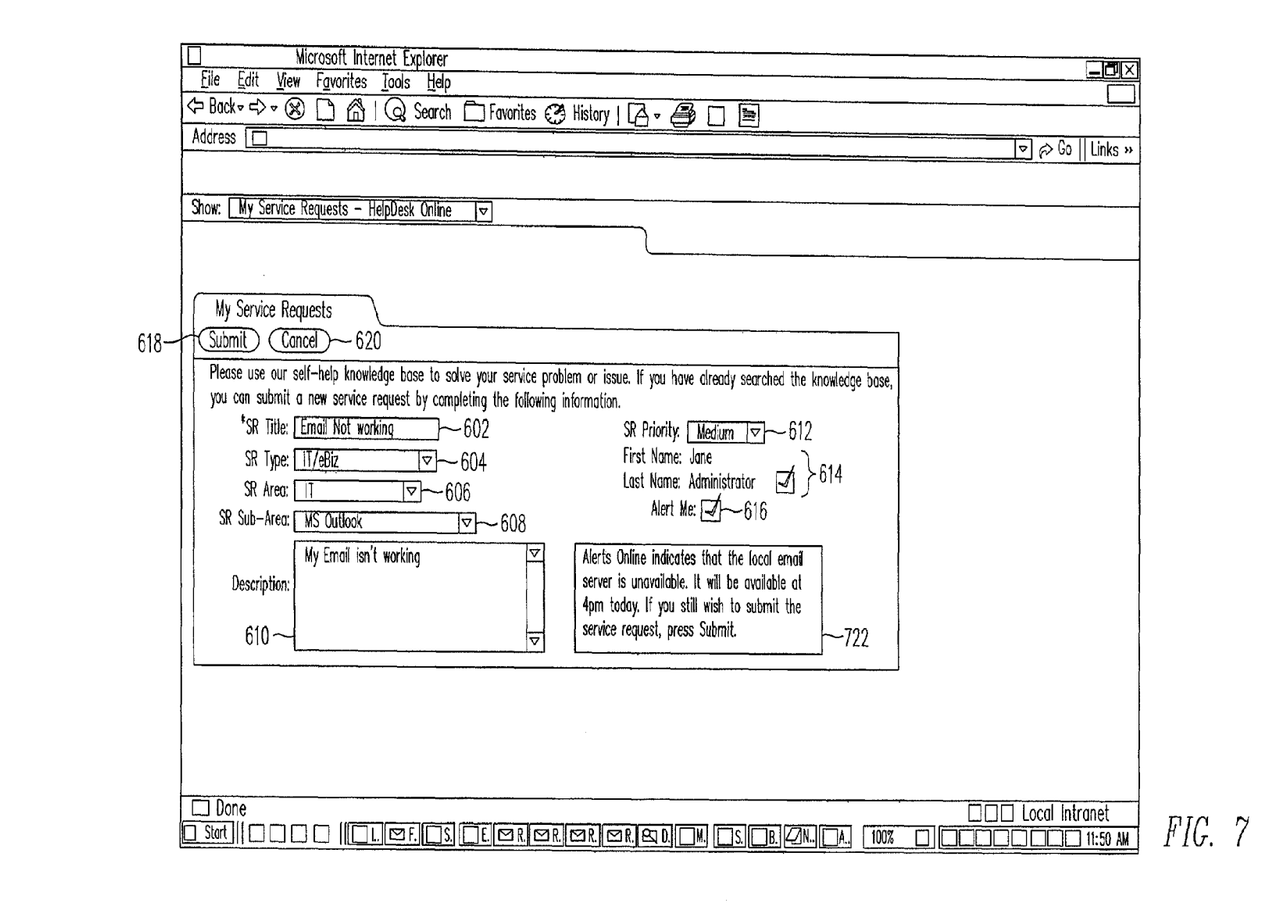
FIG. 7 is a display diagram showing a returned service request with an alert message indicating that potentially relevant system status information has been identified in one embodiment.

FIG. 7 is a display diagram showing a returned service request with an alert message 722 indicating that potentially relevant system status information has been identified. The user submitting this service request is having problems with his email, as indicated in the "SR TITLE" field 602 and the "SR DESCRIPTION" text area 610. As indicated in the alert message 722, the local email server is unavailable, which is the probable reason that the user's email is not functioning. The alert message 722 resulted from a search of available system and subsystem status information. In this embodiment, the search was conducted by comparing the "SR AREA" 606 and "SR SUBAREA" 608 fields with similar fields for the system and subsystem status information. The user may either cancel the request by selecting the "CANCEL" button 620 or follow through with submission of the request by selecting the "SUBMIT" button 618.

Figure 8:
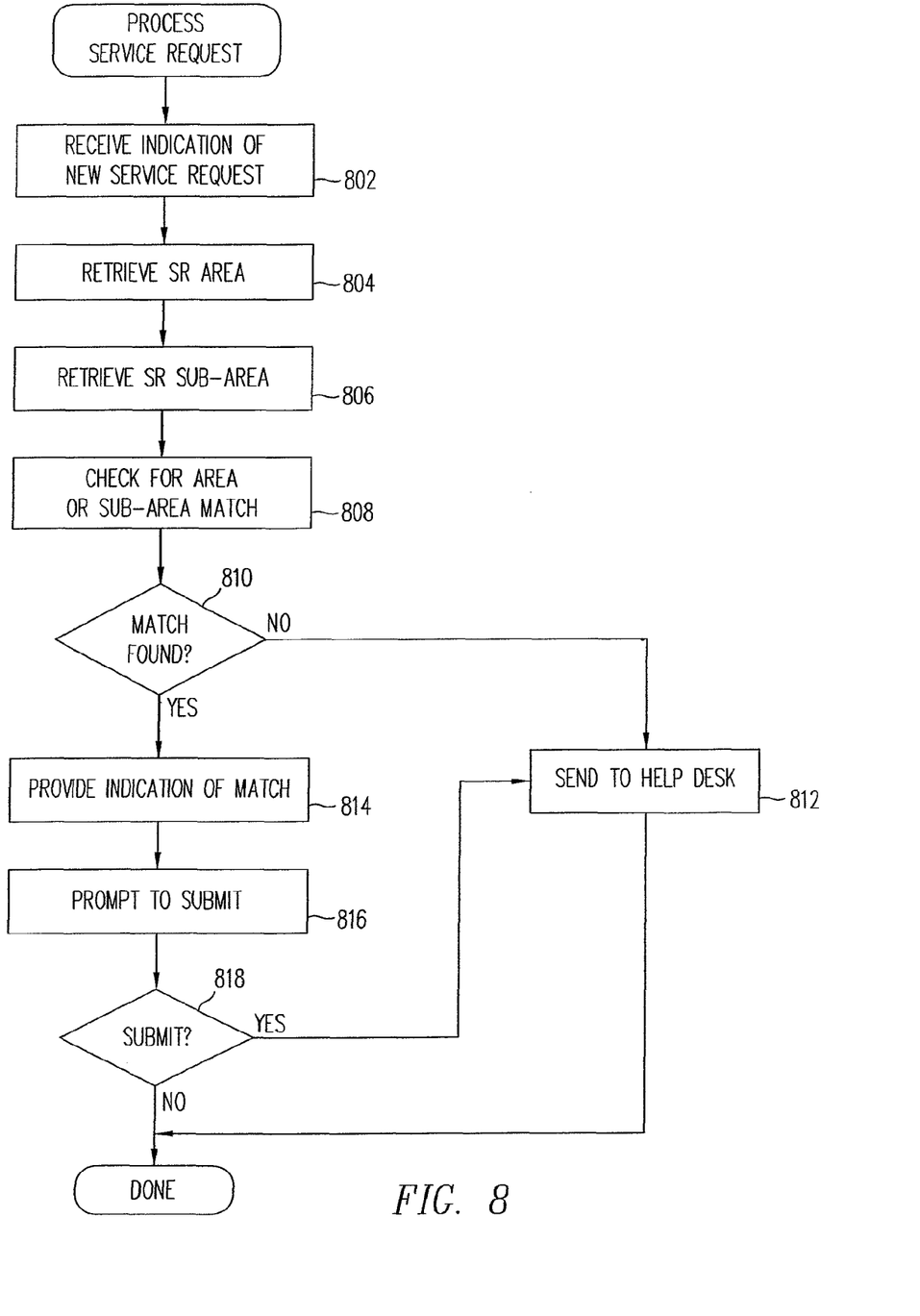
FIG. 8 is a flow diagram showing a routine for processing a service request in one embodiment.

FIG. 8 is a flow diagram showing a routine for processing a service request in one embodiment. In block 802, the routine receives an indication of a new service request submission. In block 804, the routine retrieves SR area information from the service request. In block 806, the routine retrieves SR sub-area information from the service request. In block 808, the routine searches within a collection of system and subsystem status information to determine if there are matches using the values retrieved from the "SR AREA" 606 and "SR-SUB-AREA" 608 fields of the service request. In one embodiment, the searched status information consists of system and subsystem status entries that are monitored and updated (either manually or by a computer) as the status of various systems or subsystems changes or becomes known. In another embodiment, the searched status information may consist of or include a collection of pending service requests.

In decision block 810, if a match is not found, the routine continues at block 812, where the service request is sent to the entity assigned with responsibility for addressing the service request (e.g., helpdesk), after which the routine ends. If a match is found in decision block 810, the routine continues at block 814, where the routine provides an indication of the match (e.g., a system alert) to the user. In one embodiment, the indication may identify a pending service request submitted by another user that shares the same fields. In another embodiment the indication may provide warning of a known system outage. In block 816, the routine prompts the user to, based on the indication of the match, either submit or cancel the service request. In decision block 818, if the user selects to cancel the service request, the routine ends. Else, if the user submits, the routine continues to block 812, where the service request is sent to the entity assigned with responsibility for addressing the service request (e.g., helpdesk), after which the routine ends.

IV. Conclusion

From the foregoing, it will be appreciated that specific embodiments of the invention have been described herein for purposes of illustration, but that various modifications may be made without deviating from the spirit and scope of the invention. For example, although this detailed description refers to searching information by comparing specific combinations of fields of a specific type, one skilled in the art would recognize that many information types and many combinations of information might be compared without departing from the scope of the invention. To illustrate, in one embodiment, fields indicating product categories may be compared with recall status information provided by product manufactures. In another embodiment, fields identifying locations of particular power plants may be compared with status information related to the power systems that serve those power plants. Accordingly, the invention is not limited except as by the appended claims.

What is claimed is:

1. A computing system comprising:
a processor;
a display device, coupled to the processor, wherein
the display device is configured to display
service request information, wherein
the service request information is related to submission of a service request;
a storage device, coupled to the processor, wherein
the storage device is configured to store system status information, and
the system status information is related to a status of at least one system; and
a computer memory, coupled to the processor, wherein
the computer memory stores
a user input module, wherein
the user input module is configured to receive a user input, and
the user input is related to the submission of the service request, and
a comparison subsystem, wherein
the comparison subsystem is configured to, in response to receipt of the user input by the user input module,
perform a comparison of the user input and the system status information, and
based on a result of the comparison, determine whether a correspondence exists between the user input and the system status information.

2. The computer system of claim 1, wherein the system status information comprises:
a single identifier, wherein
the single identifier is configured to identify a collection of system status information, and
the collection of system status information comprises the system status information.

3. The computer system of claim 2, wherein:
the user input module is further configured to
receive the service request information, wherein
the service request information comprises
an indication of a basis for the service request, and
the comparison subsystem is further configured to
search the collection of system status information for at least one entry that corresponds with the indication of the basis for the service request, and
if the at least one entry is found,
provide an indication that the at least one entry was found, and
allow the service request to be cancelled.

4. The computer system of claim 3, wherein the indication comprises at least one of:
an indication that a related service request is currently pending, or
an indication that a system related to the service request is functioning improperly.

5. The computer system of claim 1, wherein the system status information comprises:
a list of identifiers, wherein
each identifier of the list of identifiers is configured to identify a pending service request of a plurality of pending service requests, and
each pending service request of the plurality of pending service requests is related to the system status information.

6. The computer system of claim 1, wherein the comparison subsystem is further configured to:
the at least one system is accessible to a user of the computing system.

7. The computer system of claim 1, wherein the comparison subsystem is further configured to:
in response to a determination that the correspondence exists,
indicate existence of the correspondence by updating the service request information.

8. The computer system of claim 7, wherein the comparison subsystem is further configured to:
in response to the determination that the correspondence exists,
allow the service request to be cancelled.

9. The computer system of claim 7, wherein the comparison subsystem is further configured to:
in response to a determination that the correspondence does not exist,
submit the service request.

10. The computer system of claim 1, wherein the display device is further configured to:
in response to a determination that the correspondence exists,
display information indicating a correspondence between the service request and the system status information.

11. The computer system of claim 1, wherein the service request information comprises:

option information, wherein
the option information describes one or more options for submitting the service request.
12. The computer system of claim 11, wherein the display device is further configured to:
display information indicating a correspondence between the service request and the system status information.
13. The computer system of claim 1, wherein the user input module is configured to:
receive a plurality of instances of user input, wherein
each instance of the plurality of instances is related to submission of the service request.
14. The computer system of claim 1, wherein the system status information comprises:
information related to another service request.
15. The computer system of claim 1, wherein
the another service request is a pending service request.
16. The computer system of claim 1, wherein the system status information comprises:
updated system status information, wherein
the updated system status information is produced by updating the system status information.
17. The computer system of claim 1, wherein
the updating is performed
periodically, or
at a time at which an update is detected.
18. The computer system of claim 1, wherein the computer system is configured to:
receive the system status information, wherein
the system status information is received using a first facility; and
receive other status information, wherein
the other status information is related to a second service request,
the other status information is received using a second facility, and
the second facility comprises a plurality of input fields that mirror input fields of the first facility.
19. The computer system of claim 1, wherein
the service request information comprises
an area identifier corresponding to a system, and
a sub-area identifier corresponding to a subsystem, and
the comparison subsystem is further configured to
search for the correspondence, at least in part, by retrieving the area identifier and the sub-area identifier.
20. A method in a computing system comprising:
displaying service request information, wherein
the service request information is displayed on a display of the computing system, and
the service request information is related to submission of a service request;
receiving a user input at the computing system, wherein
the user input is related to the submission of the service request; and
in response to receipt of the user input,
comparing the user input and system status information, wherein
the comparing is performed by a processor of the computing system,
the system status information is stored in a storage device of the computing system, and
the system status information is related to a status of at least one system, and
determining whether a correspondence exists between
the user input and
the system status information, wherein
the determining is performed by the processor, and
the determining is based on a result of the comparing.
21. A computer system comprising:
a processor;
a plurality of instructions, wherein
the plurality of instructions is configured to be executed by the processor, and
the plurality of instructions comprise
a first set of instructions, executable on a computer system, configured to display service request information, wherein
the service request information is displayed on a display of the computer system, and
the service request information is related to submission of a service request, and
a second set of instructions, executable on the computer system,
configured to, in response to receipt of the user input,
compare the user input and system status information, wherein
the system status information is stored in a storage device of the computer system, and
the system status information is related to a status of at least one system, and
determine whether a correspondence exists between the user input and the system status information, wherein
the determining is based on a result of the comparing; and
a non-transitory computer memory, wherein
the non-transitory computer memory is coupled to the processor, and
the instructions are encoded in the non-transitory computer memory.

* * * * *